L. A. Dole,
Hollow Auger.
N° 26,822. Patented Jan. 10 1860.
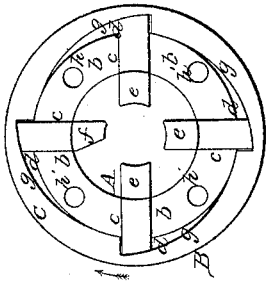
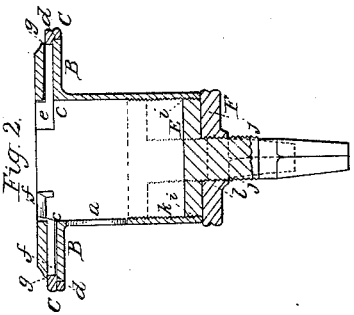 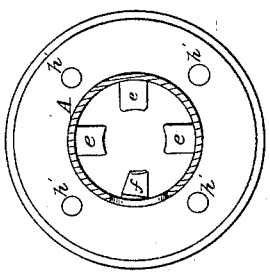
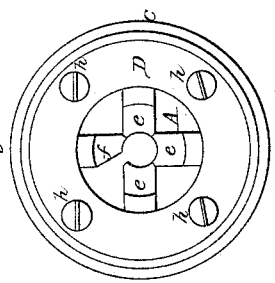 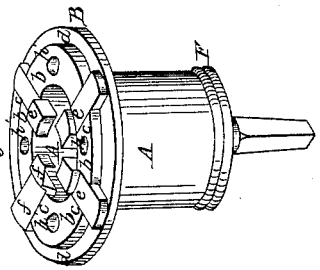
Witnesses.
Godwin & Ashe
R. W. Fenwick
Inventor:
L. A. Dole

UNITED STATES PATENT OFFICE.

L. A. DOLE, OF SALEM, OHIO, ASSIGNOR TO HIMSELF AND ALBERT R. SILVER, OF SAME PLACE.

TOOL FOR CUTTING ROUND TENONS.

Specification of Letters Patent No. 26,822, dated January 10, 1860.

*To all whom it may concern:*

Be it known that I, L. A. DOLE, of Salem, in the county of Columbiana and State of Ohio, have invented a new and useful Improvement in Tools for Cutting Round Tenons on Wood; and I do hereby declare that the following is a full, clear, and exact description of the same, reference being had to the accompanying drawings forming a part of this specification, in which—

Figure 1, is a face or end view of my improved tenon tool. Fig. 2, is a longitudinal section of the same. Fig. 3, is an end view with face plate removed. Fig. 4 a perspective view of the same, and Fig. 5, is a transverse section of the same, looking from the rear.

Similar letters of reference, in each of the several figures indicate corresponding parts.

My invention relates to tools for cutting round tenons on wood, and the nature of the same consists, first, in the arrangement of a hollow flanged cylinder, a confining plate, several radial rest blanks and one or more radial cutters, in a loose concentric ring having a series of eccentric or curved wedge shaped projections on its inner circumference, substantially in the manner hereinafter described; second, in the combination of the right hand screw thread formed on the inner circumference of the flanged cylinder and the outer circumference of the gage plate, the left hand screw thread formed on the circumference of the gage shank, and the set nut, substantially in the manner hereinafter described.

By the first feature of my invention, the rest blanks and the cutter can be readily adjusted to cut any sized tenon by simply loosening the screws of the face plate and turning the concentric ring in the proper direction, and after being adjusted can be confined securely in the position desired by tightening up the screws of the face plate; the face plate binds against the cutter and rests, and against the concentric ring, so that said ring and the rests and cutter are held firmly against the flange of the cylinder and any movement independent of one another, thus rendered impossible.

By the second feature of my invention, the gage can be adjusted and securely set at any point desired, for it will be evident that after the desired adjustment has been made and the set nut comes in contact with the rear end of the cylinder, the left hand screw will tend to force said nut still closer and thus cause it to bind so firmly that it will hold the gage from shifting.

To enable others, skilled in the art, to make and use my invention, I will proceed to describe its construction and operation.

A, represents the flanged cylinder, it has an opening $a$, to allow for the escape of chips. Its flange B, has four raised projections $b$, $b$, $b$, $b$, formed on its face, between which radial grooves $c$, $c$, $c$, $c$, are formed. These projections do not extend circumferentially to the circumference of the flange and consequently a shoulder $d$, is formed. In the grooves $c$, $c$, $c$, $c$, radial rest blanks $e$, $e$, $e$, and a cutter $f$, are placed as shown; and around the circumference of the projections $b$, $b$, $b$, $b$, a ring C, is arranged; this ring having two inner circumferences, one concentric with the flange B, of the cylinder and fitting around the same while the other is divided into four curves $g$, $g$, $g$, $g$, which are eccentric to the projections $b$, $b$, $b$, $b$, but stand directly opposite to the same as shown. The eccentric curved or wedge portions of this ring come gradually in contact with the outer ends of the rest blanks and the cutter, and as the ring is turned more or less in the direction of the arrow, the same are forced all together radially toward the center of the cylinder and thus adjusted to cut a tenon of any desired size.

D, is the face plate which confines the ring, cutter and rest blanks on the flanged cylinder. This plate is secured by screws $h$, $h$, which enter the holes $h'$, $h'$, formed in the projections $b$, $b$, $b$, $b$. When the screws are forced home, the whole is rendered compact and firm, but when they are loosened, the ring can be turned and the cutter and rest blanks adjusted as may be desired.

E, is the circular gage plate for regulating the length of the tenon.

$i$, is a left-hand screw thread on the circumference of the plate and $j$ is a right-hand thread on the shank of the same.

F, is a set nut fitted over the shank. The threads of the gage and its shank match screw threads $k$, $l$, formed on the set nut and the cylinder.

It will be evident that if the set nut is moved far enough back to allow of the gage being adjusted to the position shown in red, and said adjustment is made, the set nut will be brought up against the end of the cylinder and if the turning of the shank is continued, the left hand thread will force the set nut so firmly against the cylinder as to lock the gage in position.

The tool described can either be used in a brace as an ordinary bit, or the shank turned with a lathe mandrel and run by power.

What I claim as my invention and desire to secure by Letters Patent as an improvement in tools for cutting round tenons, is—

1. The arrangement of the flanged cylinder A face plate D, radial rests $e, e, e$, and cutter $f$, in the peculiarly constructed adjusting ring C, $g$, substantially as and for the purpose herein set forth.

2. The combination of the right-hand screw thread $k$ formed on the inner circumference of the flanged cylinder A the left-hand screw thread $l$, formed on the circumference of the gage shank, and the set-nut F, substantially as and for the purposes set forth.

The above specification of my improved tool for cutting round tenons signed by me this 23rd day of November, 1859.

L. A. DOLE.

Witnesses:
GOODWIN Y. AT LEE,
R. W. FENWICK.